(12) United States Patent
Murata

(10) Patent No.: US 8,775,928 B2
(45) Date of Patent: *Jul. 8, 2014

(54) LAYOUT-BASED PAGE CAPTURE

(75) Inventor: Robert S. Murata, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1496 days.

This patent is subject to a terminal disclaimer.

(21) Appl. No.: 11/498,293

(22) Filed: Aug. 1, 2006

(65) Prior Publication Data

US 2006/0271840 A1 Nov. 30, 2006

Related U.S. Application Data

(63) Continuation of application No. 10/159,219, filed on May 31, 2002, now Pat. No. 7,096,423.

(51) Int. Cl.
G06F 17/00 (2006.01)
G06F 17/24 (2006.01)

(52) U.S. Cl.
CPC ................................. *G06F 17/24* (2013.01)
USPC ........................................................ 715/243

(58) Field of Classification Search
USPC ......................................................... 715/243
See application file for complete search history.

(56) References Cited

U.S. PATENT DOCUMENTS 6,476,827 B1 * 11/2002 Porter ............................ 715/738
2002/0078197 A1 6/2002 Suda et al.
2002/0083132 A1 6/2002 Holland et al.
2002/0124055 A1 9/2002 Reisman
2004/0080532 A1 * 4/2004 Cragun et al. ................. 345/745
2007/0079229 A1 * 4/2007 Johnson ..................... 715/501.1

OTHER PUBLICATIONS

Adobe Systems Incorporated, "Converting Web Pages to Adobe PDF," Adobe® Acrobat® 5.0 User Guide for Windows® and Macintosh, pp. 69-77 and p. 285, Copyright 2001.
CNET Networks, Inc., "Morning Paper Pages 1.92," http://download.com.com/3000-2377-6187769.html, pp. 1-2, Jun. 4, 2001.
CNET Networks, Inc., "MM3-WebAssistant 2001/382, " http://download.com.com/3000-2377-7555711.html, pp. 1-2, Oct. 17, 2001.
Zylox, Inc., "Offline Commander," http://www.zylox.com, 16 pages, Copyright 2002.
GERAsof, "PageSaver 4.0," http://webarchive.org/web/20010926015212/http://gerasoft.com/, 4 pages, Copyright 2000-2001.
TechSmith, "SnagIt 6.0.1," available at http://www.techsmith.com, Screenshots 1-3, Copyright © 1996-2001.

* cited by examiner

*Primary Examiner* — Adam M Queler
(74) *Attorney, Agent, or Firm* — Finch & Maloney PLLC

(57) ABSTRACT

Techniques for layout-based page capture. A user selection performs a selection defining an area of interest based on the layout of an electronic document. The program retrieves electronic documents based on the defined area of interest. The selection can be performed visually on a rendering of the electronic document thereby providing the user with visual feedback as to what content has been selected. The selection can be applied across multiple electronic documents.

5 Claims, 6 Drawing Sheets

FIG._2

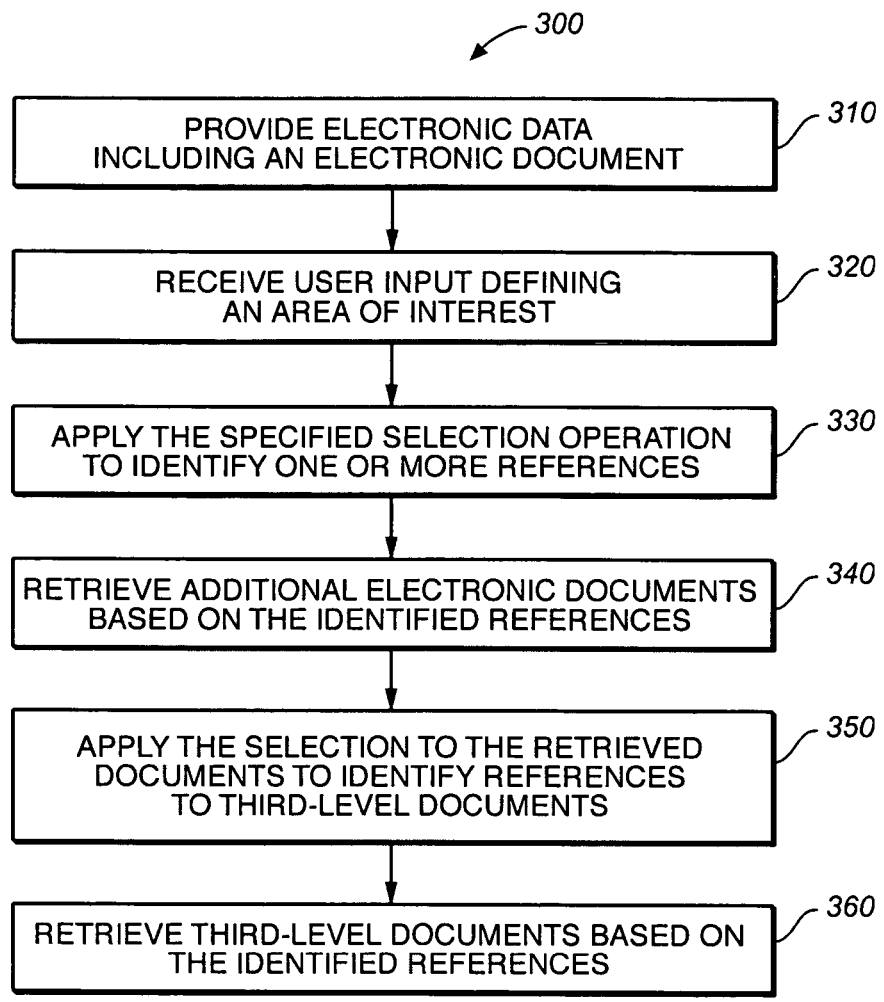
FIG._3

Adobe

| Products | Support | Purchase | Company info |
|---|---|---|---|
| ▸Products<br>Acrobat family<br>Downloads | Digital Imaging<br>Tryouts | Digital video<br>Registration | Print publishing   Web publishing |

Search

Acrobat family  [Acrobat products ▽]

Acrobat solutions

- Government
- Engineering
- Graphic arts
- Information technology
- Legal
- Finance
- Human resources
- Marketing & sales
- Accessibility Volume licensing
Events & seminars
Partners & developers

Secure and reliable distribution

Convert any document to an Adobe® Portable Docu Format (PDF) file and deliver it with complete visual to a wide variety of devices and platforms. Colleagu print your document, receive it as an e-mail attachm download it from a server, and even view it on a mo device.

- Easily convert your Microsoft Office documents t PDF
- Deliver documents with confidence to almost an hardware or software platform, including Macint Microsoft® Windows®, Linux®, Palm OS®, and PC.
- Print documents exactly as they were intended w fonts, graphics, and special characters intact.
- Secure your documents with password protectio 128-bit encryption. set options to prevent peop printing, altering, or repurposing the content.

↱ Acrobat family main
↱ Secure and reliable distribution
↱ Collaboration
↱ Transact and archive

Products

Adobe Acrobat®
Create and distribute Adobe PDF documents from your desktop.

Adobe Acrobat Distiller® Server
Enable your workgroup to convert Adobe PostScript® files to Adobe PDF over a network.

Learn more

Hitachi, Ltd.
Hitachi significantly reduces employee work hours and costs by moving from paper-based document delivery to online documentation in Adobe PDF.

📄 (PDF: 272 KB / 2 pages)

First Union Bank
By switching to an o system, the country largest bank provid employees with mo information about s and regulations.

📄 (PDF: 234 KB /

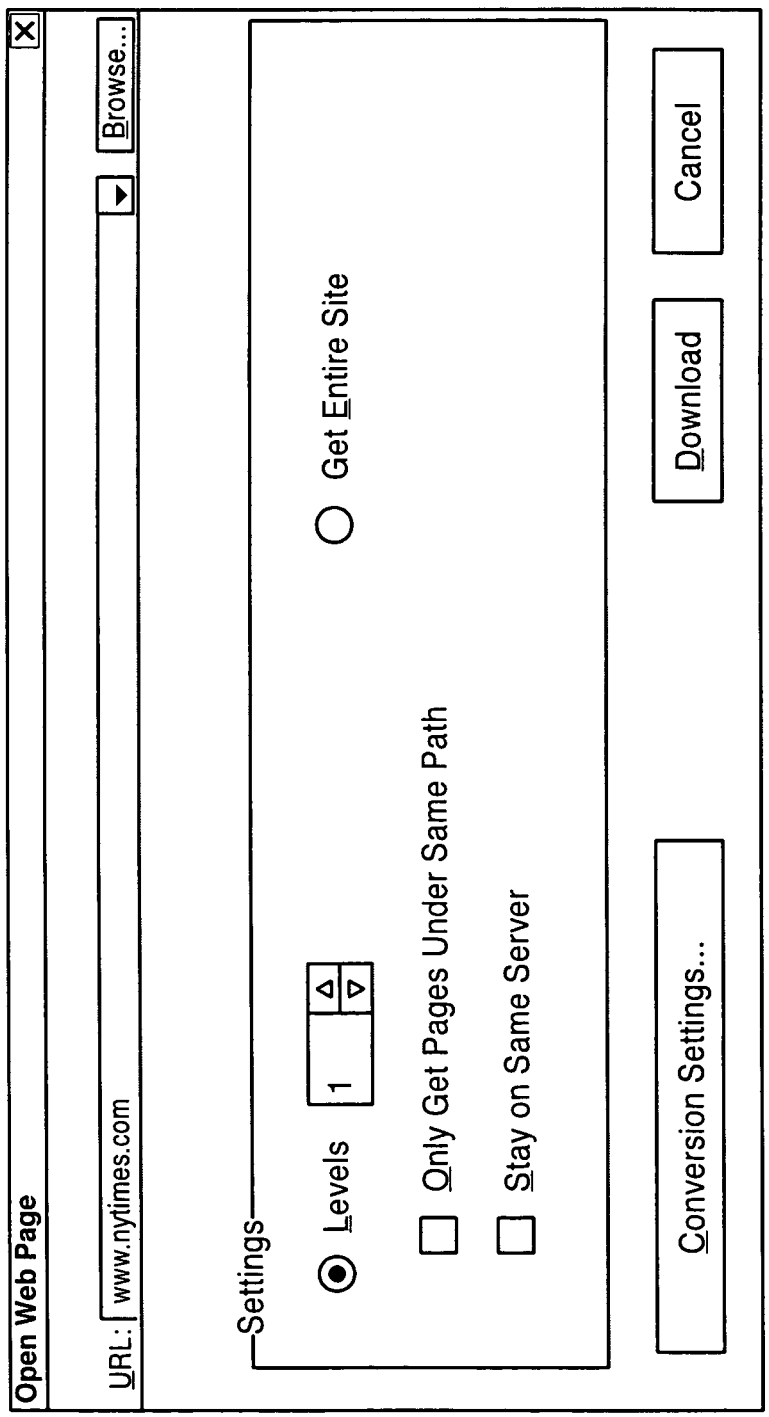
FIG._5

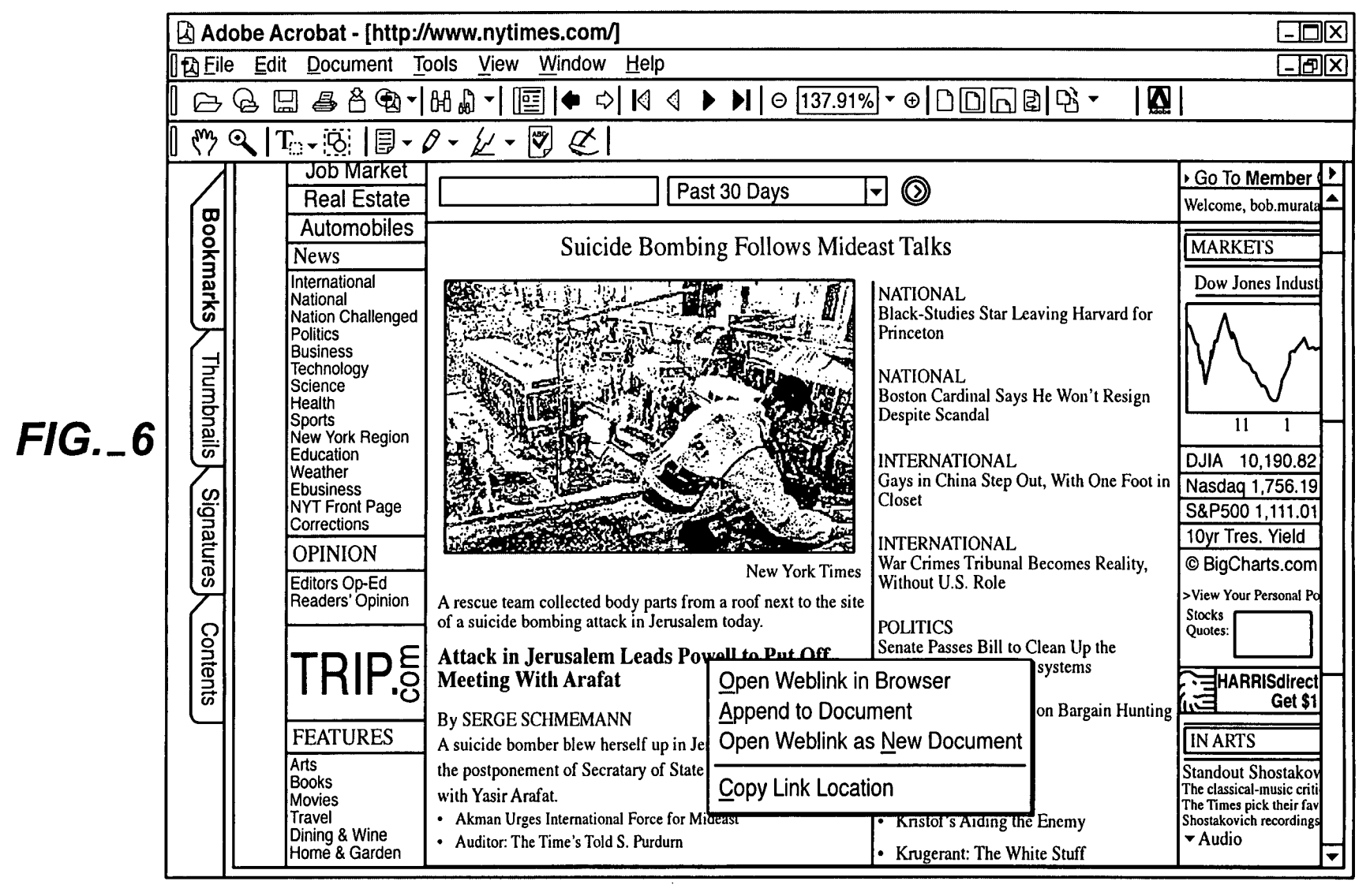

FIG._6

LAYOUT-BASED PAGE CAPTURE

CROSS-REFERENCE TO RELATED APPLICATION

This application is a continuation of, and claims priority to, U.S. patent application Ser. No. 10/159,219, entitled LAYOUT-BASED PAGE CAPTURE, filed May 31, 2002. The entire disclosure of this application is incorporated here by reference.

TECHNICAL FIELD

This invention relates to page capture and selecting content to capture.

BACKGROUND

Electronic documents typically include information content, such as text, tables, equations, graphics, images or other objects such as video or audio clips, and layout or formatting information that defines the visual appearance of the document—that is, how the content is to be arranged and represented for display. Thus, for example, a page of an electronic document can include text arranged in two columns taking up a top portion of the page and an image that occupies the bottom portion of the page. Electronic documents can be generated and viewed using any of a variety of word processing programs such as Microsoft® Word, page layout programs such as Adobe PageMaker®, or other content management programs such as Adobe Acrobat® or web browsers such as Microsoft® Internet Explorer.

Electronic documents can include a collection of one or more pages, which can represent bounded subunits of content (e.g., a page in a typical word processing document sized to be fit on particular type of paper) or unbounded subunits of content (e.g., a web page that can contain essentially any amount of content). Electronic documents, or pages within such documents, can include references or links to other locations in a page or document, or to other pages or documents, which may be available locally or at remote locations on a network, such as web pages located on the World Wide Web.

Links can be associated with any item displayed and selectable within a document, such as text, graphics or images. Electronically, links are often displayed in some distinguishing manner such as by underlining text with which the link is associated. A reader viewing a document that includes links can jump to a linked document or a different part of the same document by activating the text or a hot spot associated with a link. Links can be activated through a graphical user interface by, for example, clicking on the associated text or hot spot using a mouse or other pointing device, or through keyboard commands in a textual interface, or potentially using voice commands.

Links can be implemented as hyperlinks embedded within a document or page. A hyperlink can be implemented, for example, as HTML code that contains the address, such as the URL (uniform resource locator), for another document, such as a web page, or another location within the same web page. A hyperlink can be embedded in a text string, an image, or a portion of an image (commonly called a hot spot). Typically a web page contains a plurality of hyperlinks and a user navigates from one web page to another linked web page by activating the desired hyperlink.

A web site is a collection of web pages that are managed by or for a single entity. Typically, the web site has a start page or index page which contains links to a first level of web pages, the first level of web pages containing links to a second level of web pages, and so forth.

Content management programs, such as Adobe Acrobat®, allow users to capture or download web pages for viewing at a later time. For example, a commuter can use such a program to download articles of an online newspaper to a laptop before leaving home and later read the latest news while sitting on a train with no web connection.

A web site typically contains a wide variety of content. For example, an online newspaper may contain not only news content, but advertising content as well. Even within the news content, there can be a wide range of subjects and the user may only be interested in some of the subjects. Unfortunately, conventional programs provide limited options for selecting what content to capture. The user can explicitly choose which links to capture by manually clicking on those links while viewing a page in the program display. However, this option is tedious and time-consuming. Alternatively, some programs permit the user to specify that all links from a given page should be followed down to a specified level. While this relieves the user from manually selecting which links to follow, it can require substantial memory and processing time to capture multiple levels. It can also result in the capture of large numbers of unwanted pages. Finally, in some programs, the user can specify a specific server or path and the program will only follow links corresponding to the specified server/path. However, the users may not always want pages that share the same server or path or may find that the server or path is too restrictive.

SUMMARY

In general, in one aspect, the invention provides methods and apparatus, including computer program products, implementing techniques for layout-based page capture. The techniques include providing electronic data including a first electronic document, the first electronic document having a layout defining a rendered appearance, the first electronic document containing a plurality of references; receiving user input specifying a first selection operation that defines a first area of interest in the first electronic document based on the layout of the first electronic document; retrieving a second electronic document based on the first area of interest; and applying the first specified selection operation to define a second area of interest in the second electronic document.

Particular implementations can include one or more of the following features. The user input can include a click and drag operation performed on a rendered representation of the first electronic document. The areas of interest can be exclusion areas or inclusion areas. The areas of interest can be nested or overlapping each other.

The invention can be implemented to realize one or more of the following advantages. Users can select links for capture based on the layout of the content rather than just the location of the content in the HTML code. Instead of selecting links individually, the user can define an area of interest that corresponds to multiple links. The selection method can be performed visually on a rendering of the web page thereby providing the user with visual feedback as to what content has been selected. The user-defined area of interest can be applied across multiple web pages.

The details of one or more embodiments of the invention are set forth in the accompanying drawings and the descrip-

DESCRIPTION OF DRAWINGS

FIG. 2 illustrates content displayed to a user.
FIG. 3 illustrates a method of selecting content for capture.
FIG. 4 illustrates captured content.
FIG. 5 illustrates an exemplary content management program.
FIG. 6 illustrates an exemplary content management program.

Like reference symbols in the various drawings indicate like elements.

DETAILED DESCRIPTION

Figure 1:
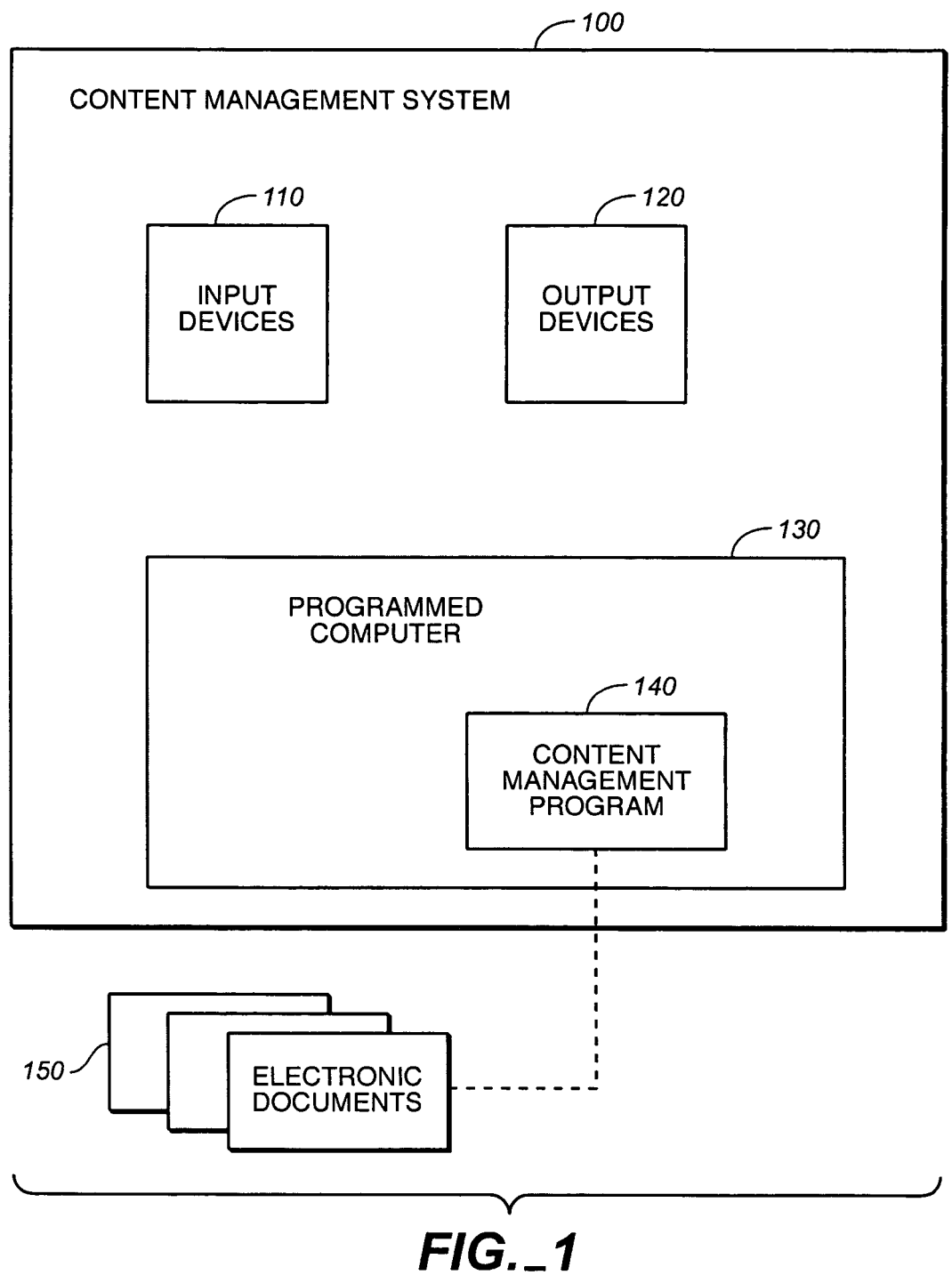
FIG. 1 illustrates a content management system.

FIG. 1 shows a content management system 100 including input devices 110, output devices 120, and a programmed computer 130 running a content management program 140. Content management program 140 manages electronic documents 150, providing functionality for creating, manipulating, storing and displaying electronic documents, which can include, for example, web pages, pdf documents, electronic books, or documents (including files) in other conventional formats. Electronic documents 150 are typically characterized by content information, such as text, images and the like, intended generally to convey information to the document's user, and structure or layout information, which defines the organization of the content, such as how the content information will appear when rendered for display to the user. The layout information can identify structural features—for example, headings, paragraphs, columns, and the like—and it can assign particular features to appear in certain locations in the document (e.g., on the rendered page). The content management program 140 can be implemented as part of a web browser or a conventional content management program such as Adobe Acrobat®. Using content management program 140, users can view displayed content and identify additional content for capture based on the layout of the displayed content.

As shown in FIG. 2, an electronic document 150 can include one or more references 220, which represent links to other electronic documents. Like electronic document 150, the other electronic document can be a pdf document, an electronic book, or other document (including image, sound or video files) that contains content in a format compatible with content management program 140. The other electronic document can be, but is not necessarily, in the same format as electronic document 150. References 220 can include hyperlinks embedded in the electronic document 150, including text strings or hot spots as discussed above.

FIG. 3 illustrates a method 300 of selecting content for capture. The method 300 begins when content management program 140 provides electronic data including an electronic document (310). The electronic data can be provided in response to user input. For example, in one implementation, a user specifies a location or name of the electronic document (e.g., a file name or URL), as shown in FIG. 5. In response, content management program 140 retrieves the electronic document and renders the content for display to the user, as shown in FIG. 6.

Content management program 140 receives user input specifying a selection operation that defines an area of interest (320). The specified selection operation defines the area of interest based on the layout of the electronic document. For example, the user views the rendered document, identifies a portion of the document that interests him, and specifies a selection operation accordingly. Preferably, the selection operation can be specified using conventional graphical selection tools, such as marquee selection tools, magic wand tools, or the like, provided in illustration and image processing programs such as Adobe Illustrator® or Adobe Photoshop® and, when applied to the electronic document, defines a region or area in the rendered document.

An area of interest is a user-defined region, such as a rectangle or other shaped region, that frames a portion or portions of the content in the electronic document. The area of interest is not required to conform to selection areas that may be pre-defined in the document, such as hotspots or text strings. The area of interest can have a regular or irregular shape, and can be continuous or discontinuous.

As shown in FIG. 2, the area of interest 200 is a user-defined selection (here a rectangular selection) that frames a top portion 210 of the content in the electronic document. The top portion 210 contains one or more references 220 to additional electronic documents, some text and graphics 230 (which are not references to additional documents) and some empty space 240. Visually, the area of interest frames a portion of the rendered document. The framed portion may contain specific references (e.g., text strings or hot spots) and/or other content.

Content management program 140 applies the specified selection operation to identify one or more references in the electronic document (330). For example, the area of interest 200 shown in FIG. 2 distinguishes between the references 220 located within the top portion 210 and the references 250 which are located outside the top portion 210. The area of interest can correspond to content of interest to the user (defining an "inclusion area"), in which case content management program 140 identifies all references located within the area of interest. Alternatively, the area of interest can correspond to content not of interest to the user (defining an "exclusion area"), in which case content management program 140 identifies all references except those references located within the area of interest. For example, the area of interest shown in FIG. 2 can correspond to an exclusion area, thereby excluding the navigational references from being captured. More than one area of interest can be defined for a given electronic document. Each area of interest can be an inclusion area or an exclusion area and can frame portions of the document that are separate, overlapping or nested with respect to each other. For example, an exclusion area, such as the area of interest 200, can be nested inside an inclusion area 201, such that content management program 140 identifies all references located within the outer inclusion area 201, but not within the inner exclusion area.

Content management program 140 follows the identified references and retrieves additional electronic documents based on those references (340). As shown in FIG. 5, users can specify a depth level for the capture. For example, capturing one level involves following only the references found in the first document. Capturing two levels involves following the references found on the first document and also the references found on the electronic documents retrieved by the first level search ("second-level documents").

The specified selection operation can be applied to the second-level documents to identify still more documents for capture. Pages within a particular web site often share a common layout. For example, it is common for a web page to have a navigational bar located within a certain portion of the layout, such as a top portion, and for the navigational bar to remain fixed at that location for all pages within a given web site. Banner advertising is another example of content that commonly remains statically placed at a certain portion of the layout across multiple web pages within a particular web site. By applying a particular selection operation (and thereby a particular area of interest) to multiple pages in such a web site, the user can specify a particular type or class of content to capture, while excluding other undesired content from the capture.

Content management program 140 applies the specified selection operation to the retrieved electronic documents to define an area or areas of interest in those documents and thereby identify references to third-level documents (350). FIG. 4 shows a retrieved second-level document 400 which contains a navigational bar that is located in the same position as the navigational bar of the first level document 150. Thus, when the selection operation defining area of interest 200 is applied to second-level electronic document 400, a new area of interest is generated that frames the navigational bar in second-level document 400 just as it framed the navigational bar of first-level document 150. In this way, the navigational links can be excluded for each level of the capture.

Content management program 140 retrieves third-level documents based on the identified references to third-level documents (360). The captured documents can be stored in memory as one or more documents in pdf format or any other electronic document format.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method comprising:
   providing electronic data including a first electronic document, the first electronic document having a layout defining a first rendered appearance, the layout being formatting information defining a first rendered appearance of the first electronic document, the first electronic document containing a plurality of references;
   receiving user input specifying a first selection operation that defines a first area of interest in the first electronic document based on the layout of the first electronic document;
   using the first area of interest to define a first action area over the first rendered appearance, the first action area having a position relative to the first rendered appearance, the first action area containing one or more of the plurality of references, the defined first action area being less than an entire area of the first electronic document;
   identifying the references contained in the first action area;
   retrieving a second electronic document using one of the references contained in the first action area;
   using the definition of the first action area to define automatically a second action area over a second rendered appearance of the second electronic document, the second action area having the same position over the second rendered appearance as the first action area has over the first rendered appearance; and
   identifying references contained in the second action area.

2. The method of claim 1, wherein:
   the first area of interest frames a portion of the first electronic document; and
   identifying the references contained in the first action area includes identifying one or more of the plurality of references that are located within the framed portion of the first electronic document.

3. The method of claim 1, wherein:
   the first area of interest frames a portion of the first electronic document; and
   identifying the references contained in the first action area includes identifying one or more of the plurality of references that are located outside the framed portion of the first electronic document.

4. The method of claim 1, wherein the user input includes a click and drag operation performed on the first rendered appearance of the first electronic document.

5. The method of claim 1, further comprising retrieving one or more third electronic documents using the references contained in the second action area.

* * * * *